United States Patent
Gruss et al.

(10) Patent No.: US 9,426,168 B1
(45) Date of Patent: Aug. 23, 2016

(54) FAST-FLUX DETECTION UTILIZING DOMAIN NAME SYSTEM INFORMATION

(71) Applicant: EMC Corporation, Hopkinton, MA (US)

(72) Inventors: Eyal Yehowa Gruss, Kiryat Ono (IL); Ereli Eran, Tel Aviv (IL); Alex Vaystikh, Hod Hasharon (IL); Eyal Kolman, Tel Aviv (IL); Alon Kaufman, Bnei Dror (IL)

(73) Assignee: EMC Corporation, Hopkinton, MA (US)

( * ) Notice: Subject to any disclaimer, the term of this patent is extended or adjusted under 35 U.S.C. 154(b) by 121 days.

(21) Appl. No.: 14/471,540

(22) Filed: Aug. 28, 2014

(51) Int. Cl.
*G06F 15/173* (2006.01)
*H04L 29/06* (2006.01)
*H04L 12/26* (2006.01)

(52) U.S. Cl.
CPC ............ *H04L 63/1416* (2013.01); *H04L 43/04* (2013.01); *H04L 43/0876* (2013.01)

(58) Field of Classification Search
CPC .. H04L 63/1416; H04L 43/04; H04L 43/0876
USPC ........................................................ 709/224
See application file for complete search history.

(56) References Cited

U.S. PATENT DOCUMENTS

| | | | | |
|---|---|---|---|---|
| 8,260,914 | B1 * | 9/2012 | Ranjan ................ | H04L 61/1511 709/224 |
| 8,341,742 | B2 * | 12/2012 | Lee ................... | H04L 29/12066 713/189 |
| 8,516,585 | B2 | 8/2013 | Cao et al. | |
| 8,539,577 | B1 | 9/2013 | Stewart et al. | |
| 8,661,544 | B2 | 2/2014 | Yen et al. | |
| 8,931,088 | B2 * | 1/2015 | Chen ................... | H04L 63/1408 726/22 |
| 2010/0235915 | A1 | 9/2010 | Memon et al. | |
| 2011/0314542 | A1 * | 12/2011 | Viswanathan ........ | G06F 21/554 726/23 |
| 2012/0042381 | A1 * | 2/2012 | Antonakakis ....... | H04L 63/1483 726/22 |
| 2012/0084860 | A1 * | 4/2012 | Cao .................... | H04L 63/1441 726/23 |

OTHER PUBLICATIONS

C.-M. Chen et al., "Detecting Hybrid Botnets with Web Command and Control Servers or Fast Flux Domain," Journal of Information Hiding and Multimedia Signal Processing, Apr. 2014, pp. 263-274, vol. 5, No. 2.

(Continued)

*Primary Examiner* — Tauqir Hussain
(74) *Attorney, Agent, or Firm* — Ryan, Mason & Lewis, LLP

(57) ABSTRACT

A processing device comprises a processor coupled to a memory and is configured to determine a first set of features from domain name system (DNS) information, the first set of features being defined over a domain, and to determine a second set of features from the DNS information, the second set of features being defined over internet protocol (IP) addresses returned for the domain. The processing device is further configured to compute a fast-flux score based on the first and second sets of features, and to utilize the fast-flux score to characterize fast-flux activity relating to the domain. For example, the processing device can be configured to compare the fast-flux score to a threshold, and to generate an indicator of the presence or absence of fast-flux activity based on a result of the comparison. The processing device may be implemented in a computer network or network security system.

20 Claims, 2 Drawing Sheets

(56) References Cited

OTHER PUBLICATIONS

C.-M. Chen et al., "Detection of Fast-Flux Domains," Journal of Advances in Computer Networks, Jun. 2013, pp. 148-152, vol. 1, No. 2.

L. Bilge et al., "Exposure: a Passive DNS Analysis Service to Detect and Report Malicious Domains," ACM Transactions on Information and System Security (TISSEC), Article No. 14, Apr. 2014, pp. 1-28, vol. 16, No. 4.

E. Passerini et al., "FluXOR: Detecting and Monitoring Fast-Flux Service Networks," 5th International Conference on Detection of Intrusions and Malware, and Vulnerability Assessment (DIMVA), Jul. 2008, pp. 186-206, Paris, France.

A. Caglayan et al., "Real-Time Detection of Fast Flux Service Networks," Cybersecurity Applications & Technology Conference for Homeland Security (CATCH), Mar. 2009, pp. 285-292.

S. Martinez-Bea et al., "Real-Time Malicious Fast-Flux Detection Using DNS and Bot Related Features," 11th Annual International Conference on Privacy, Security and Trust (PST), Jul. 2013, pp. 369-372, Tarragona, Catalonia, Spain.

RSA Security Analytics, "Detect & Investigate Threats." Data Sheet, Oct. 2013, 6 pages.

W. Xu et al., "New Trends in FastFlux Networks," https://media.blackhat.com/us-13/US-13-Xu-New-Trends-in -FastFlux-Networks-WP.pdf, 2013, 5 pages.

T. Holz et al., "Measuring and Detecting Fast-Flux Service Networks," Proceedings of the Network and Distributed System Security Symposium (NDSS), Feb. 2008, 12 pages.

R. Perdisci et al., "Detecting Malicious Flux Service Networks Through Passive Analysis of Recursive DNS Traces," Annual Computer Security Applications Conference (ACSAC), Dec. 2009, pp. 311-320.

R. Perdisci et al., "Early Detection of Malicious Flux Networks Via Large-Scale Passive DNS Traffic Analysis," IEEE Transactions on Dependable & Secure Computing, Sep. 2012, pp. 714-726, vol. 9, No. 5.

Wikipedia, "Reserved IP Addresses," http://en.wikipedia.org/wiki/Reserved_IP_addresses, Jul. 2014, 5 pages.

* cited by examiner

FAST-FLUX DETECTION UTILIZING DOMAIN NAME SYSTEM INFORMATION

FIELD

The field relates generally to computer networks, and more particularly to techniques for detecting fast-flux activity in a computer network.

BACKGROUND

In computer networks, domain names are translated to Internet Protocol (IP) addresses by Domain Name System (DNS) servers. Fast-flux typically refers to DNS techniques used by networks of compromised computers or "botnets" to hide malicious websites, such as phishing sites and malware delivery sites, behind a rapidly-changing network of "flux agents" serving as proxies. Dedicated malicious DNS servers return IP addresses of the proxies in response to DNS requests relating to the domain name of a given malicious website. Fast-flux generally involves associating numerous IP addresses with a single domain name and rotating the IP addresses at high frequency through alteration of DNS records. This not only makes it very difficult to detect the actual malicious website, but also thwarts defense mechanisms such as IP-based access control lists (ACLs).

SUMMARY

Illustrative embodiments of the invention advantageously provide fast-flux detection techniques that are particularly efficient and easy to implement. For example, certain embodiments provide simple and effective passive detection of fast-flux activity utilizing only DNS response logs, although other types of DNS information can additionally or alternatively be used in other embodiments.

In one embodiment, a processing device comprises a processor coupled to a memory and is configured to determine a first set of features from DNS information, the first set of features being defined over a domain, and to determine a second set of features from the DNS information, the second set of features being defined over IP addresses returned for the domain. The processing device is further configured to compute a fast-flux score based on the first and second sets of features, and to utilize the fast-flux score to characterize fast-flux activity relating to the domain. For example, the processing device can be configured to compare the fast-flux score to a threshold, and to generate an indicator of the presence or absence of fast-flux activity based on a result of the comparison.

A given such processing device configured with fast-flux detection functionality based on first and second sets of features may be implemented, for example, in one or more network devices of a computer network, or in a security analytics system or other type of network security system associated with the computer network.

Other embodiments include, without limitation, methods, apparatus, networks, systems and articles of manufacture comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
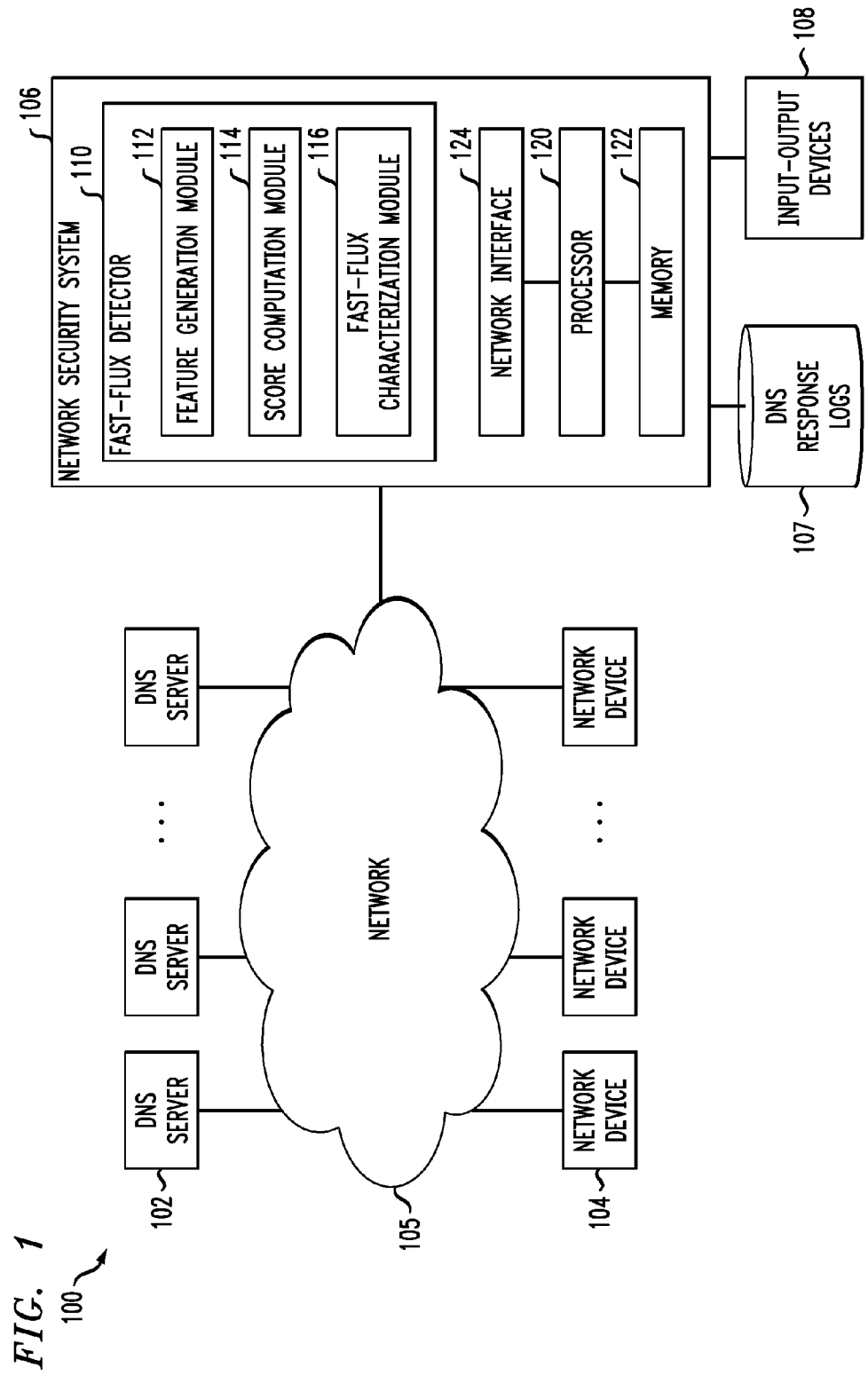
FIG. 1 shows a computer network configured to detect fast-flux activity in an illustrative embodiment of the invention.

FIG. 1 shows a computer network 100 configured in accordance with an illustrative embodiment of the invention. The computer network 100 comprises a plurality of DNS servers 102 and a plurality of additional network devices 104. The DNS servers 102 and additional network devices 104 communicate over a network 105. The additional network devices 104 may comprise, for example, client devices, web servers, network appliances or other types of devices, in any combination. Such devices are examples of what are more generally referred to herein as "processing devices."

In one possible operating scenario, one or more of the network devices 104 comprise uncompromised computers while one or more other ones of the network devices 104 comprise compromised computers of a botnet. Numerous other operating scenarios involving a wide variety of different types and arrangements of one or more processing devices are possible, as will be appreciated by those skilled in the art.

The network 105 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising network devices configured to communicate using IP or other related communication protocols.

The computer network 100 further comprises a network security system 106 coupled to the network 105. The network security system 106 has associated storage devices 107 for storing DNS response logs, possibly obtained from at least a subset of the DNS servers 102. The storage devices 107 associated with the network security system 106 may comprise, for example, storage products such as VNX® and Symmetrix VMAX®, both commercially available from EMC Corporation of Hopkinton, Mass. A variety of other storage products may be utilized to implement at least a portion of the storage devices 107.

Also associated with the network security system 106 are input-output devices 108, which illustratively comprise keyboards, displays or other types of input-output devices in any combination. Such input-output devices are used to support one or more user interfaces to the network security system 106, as well as to support communication between the network security system 106 and other related systems and devices not explicitly shown.

The network security system 106 further comprises a fast-flux detector 110. The fast-flux detector 110 is configured to detect fast-flux activity involving portions of the computer network 100, such as at least a subset of the network devices 104 or other network devices implemented within the network 105.

The fast-flux detector 110 in this embodiment comprises a feature generation module 112, a score computation module 114 and a fast-flux characterization module 116. It is to be appreciated that this particular arrangement of modules is exemplary only, and alternative arrangements can be used in other embodiments. For example, the functionality associated with the modules 112, 114 and 116 in other embodiments can be combined into a single module, or separated across a larger number of modules.

The network security system 106 in the FIG. 1 embodiment is assumed to be implemented using at least one processing device. Each such processing device generally comprises at least one processor and an associated memory, and implements one or more functional modules for controlling certain features of the network security system 106.

More particularly, the network security system 106 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the network security system 106 to communicate over the network 105 with the DNS servers 102 and the other network devices 104, and comprises one or more conventional transceivers.

At least portions of the fast-flux detector 110 of the network security system 106, such as portions of one or more of feature generation module 112, score computation module 114 and fast-flux characterization module 116, may be implemented at least in part in the form of software that is stored in memory 122 and executed by processor 120.

It is to be understood that the particular set of elements shown in FIG. 1 for providing fast-flux detection in a computer network is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 106 can be eliminated and the fast-flux detector 110 can be implemented elsewhere in the computer network 110, such as within one or more of the network devices 104.

In some embodiments, the network security system 106 is a part of or otherwise associated with another system, such as, for example, a security operations center (SOC) or a critical incident response center (CIRC).

Additionally or alternatively, the network security system 106 can be part of or incorporate an otherwise conventional security analytics system, such as the RSA Security Analytics system commercially available from RSA, The Security Division of EMC Corporation of Hopkinton, Mass.

Other embodiments can implement the network security system 106 and its associated fast-flux detector 110 as part of or in conjunction with a security information and event management (SIEM), such as the enVision® platform, also commercially available from RSA. Additional details regarding SIEM systems can be found in, for example, U.S. patent application Ser. No. 12/982,288, filed Dec. 30, 2010 and entitled "Distributed Security Information and Event Management System with Application-Injected Remote Components," which is commonly assigned herewith and incorporated by reference herein.

An exemplary process utilizing fast-flux detector 110 in computer network 100 will now be described in more detail with reference to the flow diagram of FIG. 2. It is to be understood that this particular process is exemplary only, and additional or alternative processes can be carried out in other embodiments.

In this embodiment, the exemplary process includes steps 200 through 206, which are assumed to be performed by the fast-flux detector 110 in conjunction with an attempt to detect fast-flux activity in the computer network 100.

In steps 200 and 202, respective first and second sets of features are determined from DNS information. The DNS information in this embodiment is assumed to comprise DNS response logs from storage devices 107. Accordingly, the fast-flux detection in this embodiment is an illustrative example of what is referred to herein as "passive" fast-flux detection. The first and second sets of features are also referred to herein as respective sets of first order and second order features.

The first and second order features are configured to distinguish fast-flux activity from normative DNS activity, and are determined in this embodiment based on a number of assumptions regarding fast-flux activity. More particularly, it is assumed in the present embodiment that fast-flux activity has the following characteristics:

1. High number of different IP addresses
2. High number of different autonomous system numbers (ASNs)
3. Low degree of IP repetition (high rotation)
4. Low degree of ASN repetition (high rotation)
5. Low number of users
6. IP addresses are rarely used by other users or domains
7. ASNs are mostly small In the above, users are identified with the destination IP address of the DNS response. Other embodiments can use more elaborate modeling of users, possibly involving IP address to user mapping.

Also, the ASN referred to in the foregoing list identifies an entity controlling a range of IP addresses. For a given IP address, the corresponding ASN may be obtained by a service provider such as MaxMind. IP addresses for which this information is missing are treated as belonging to a special "missing ASN" classification.

The present embodiment defines 14 features to capture the above-listed characteristics of fast-flux activity, including 7 first order features and 7 second order features. Other sets of features can be used in other embodiments.

As indicated above, these features are determined by processing DNS response logs. This processing is illustratively configured to filter out any DNS responses for which all returned IP addresses are reserved IP addresses. These include IP addresses reserved by the Internet Engineering Task Force (IETF) and the Internet Assigned Numbers Authority (IRNA) for special purposes, as described in more detail in http://en.wikipedia.org/wiki/Reserved_IP_addresses, which is incorporated by reference herein.

The first order features determined in step 200 are defined over a domain, and illustratively include the following features denoted A through G:

A. Count of IP addresses overall: The number of distinct IP addresses returned for the domain.

B. Median of IP addresses per response: The median of the number of distinct IP addresses per response.

C. Number of ASNs overall: The number of distinct ASNs to which the IP addresses belong.

D. Median of ASNs per response: The median of the number of distinct ASNs to which the IP addresses belong per response.

E. Daily IP repetition: The number of distinct (IP address, date) pairs divided by feature A.

F. Daily ASN repetition: The number of distinct (ASN, date) pairs divided by feature C.

G. Count of users on the domain: The number of distinct destination IP addresses.

The second order features determined in step 202 are defined over IP addresses returned for the domain, and illustratively include the following features denoted H through N:

H. Count of users on all IP addresses associated with the domain: The number of distinct destination IP addresses appearing with any of the IP addresses returned for the domain.

I. Median of users on IP addresses per IP address: The median of the number of distinct destination IP addresses per returned IP address.

J. Count of roots on IP addresses overall: The number of distinct roots appearing with any of the IP addresses.

K. Median of roots on IP addresses per IP address: The median of the number of distinct roots per returned IP.

L. Median of IP addresses on ASNs per ASN: The median of the number of distinct returned IP addresses appearing with any of the ASNs per ASN.

M. Median of users on ASNs per ASN: The median of the number of distinct destination IP addresses appearing with any of the ASNs per ASN.

N. Median of roots on ASNs per ASN: The median of the number of distinct roots appearing with any of the ASNs per ASN.

In determining the above second order features defined over IP addresses returned for the domain, reserved IP addresses are ignored for features H-K, and "missing ASN" IP addresses are ignored for features L-M.

Again, other arrangements of features can be used in other embodiments. For example, various subsets of the features in the first and second sets can be used. As a more particular example of such an arrangement, in embodiments in which it is desirable to detect fast-flux activity for fast-flux types that return a single IP address per response, features B and D can be modified or eliminated from the detection process. Also, the configuration of various features can be varied. For example, features that utilize median can instead utilize another type of arithmetic function, such as mean, or combinations of different types of functions.

It should be noted that the first and second sets of features can be determined on a per sub-domain basis or per domain root basis. For example, for roots having more than one sub-domain, including the root itself, the features can be determined in an aggregate manner over the multiple sub-domains of the domain root.

In step 204, a fast-flux score is computed by score computation model 114 based on the first and second sets of features determined in respective steps 200 and 202. More particularly, in the present embodiment, the above-described first and second order features are combined to provide a unified fast-flux score indicative of the presence or absence of fast-flux activity in the domain at issue.

As will be described in more detail below, computing a fast-flux score based on the first and second sets of features in the present embodiment involves weighting at least a subset of the first set of features, weighting at least a subset of the second set of features, and computing the fast-flux score as a specified function of the weighted first set of features and the weighted second set of features.

As a more particular example, assuming that the first and second sets of features collectively comprise all of the 14 features A through N described above, the fast-flux score is computed as follows:

$$FF = (A\char`^a * B\char`^b * C\char`^c * D\char`^d) / (E\char`^e * F\char`^f * G\char`^g * H\char`^h * I\char`^i * J\char`^j * K\char`^k * L\char`^l * M\char`^m * N\char`^n),$$

where FF denotes the fast-flux score and a, b, . . . n denote weights for respective ones of the features A, B, . . . N. The weights a, b, . . . n are utilized to account for correlation between the features. In this example, it is assumed that, of the above 14 features, relatively high values for the first four features and relatively low values for the remaining features tend to indicate the presence of fast-flux activity in the domain.

The above computation is an example of one possible technique for combining the first and second sets of features into a unified fast-flux score using a weighted geometric mean, although other types of functions of the first and second sets of features can be used in other embodiments.

The exemplary fast-flux score FF given above is a raw score, and can be normalized as follows:

$$NFF = FF/(\mu + FF),$$

where NFF denotes the normalized fast-flux score and $\mu$ denotes a configurable normalization parameter. By way of example, in some embodiments NFF illustratively denotes the normalized fast-flux score in the interval [0 . . . 1) and $\mu$ denotes the raw score that would be normalized to a value of 0.5.

In computing the fast-flux score based on the first and second sets of features, the fast-flux score may be set to a zero value if a number of distinct IP addresses in the IP addresses returned for the domain is less than or equal to a threshold minimum number $\alpha$ of distinct IP addresses. This score adjustment in the context of the above example can be more particularly characterized as follows:

$$\text{IF } A \leq \alpha \text{ THEN } FF = 0.$$

Similarly, the fast-flux score may be set to a null value if a number of responses for the domain is less than or equal to a threshold minimum number $\rho$ of responses. This score adjustment in the context of the above example can be more particularly characterized as follows:

$$\text{IF number\_of\_responses\_per\_domain} \leq \rho \text{ THEN } FF = \text{NULL}.$$

In the present embodiment, relatively high raw and normalized scores are generally indicative of the presence of fast-flux activity.

One possible set of values for the weights and other parameters utilized in the above example is as follows:

$$a = b = c = d = 0.25$$

$e=f=g=h=i=j=k=1=m=n=0.01$ $\alpha=\rho=1$ $\mu=3.$

It should be appreciated, however, that alternative parameter values, as well as different arrangements of weights and other parameters, may be used in other embodiments.

In step 206, the fast-flux score computed in step 204 is utilized to characterize fast-flux activity relating to the domain. For example, the fast-flux score can be compared to a designated threshold, and an indicator of the presence or absence of fast-flux activity generated based on a result of the comparison. Numerous other techniques can be used to characterize fast-flux activity for one or more domains based at least in part on one or more fast-flux scores computed in the manner described above.

Figure 2:
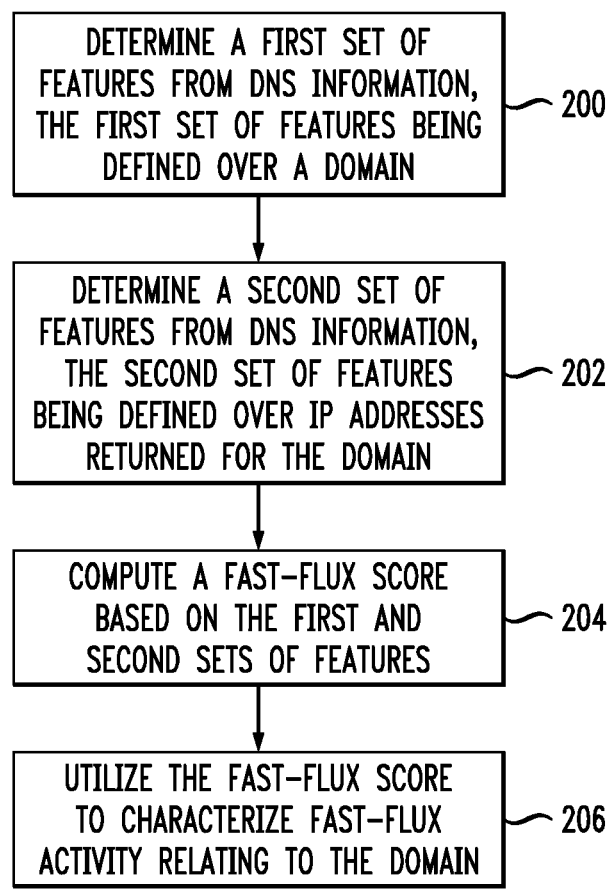
FIG. 2 is a flow diagram of an exemplary process for detecting fast-flux activity in the computer network of FIG. 1.

The particular processing operations and other network functionality described in conjunction with the flow diagram of FIG. 2 are presented by way of illustrative example only, and should not be construed as limiting the scope of the invention in any way. Alternative embodiments can use other types of processing operations to implement fast-flux detection for a computer network. For example, the ordering of the process steps may be varied in other embodiments, or certain steps may be performed concurrently with one another rather than serially. Also, the process steps may be repeated periodically in conjunction with respective distinct fast-flux detection instances.

Illustrative embodiments of the invention advantageously provide fast-flux detection techniques that are particularly efficient and easy to implement. For example, certain embodiments provide simple and effective passive detection of fast-flux activity utilizing only DNS response logs.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of DNS information, feature sets determined from the DNS information, and fast-flux score computations based on the feature sets may be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising steps of:
    determining a first set of features from domain name system (DNS) information stored in at least one database of a computer network, the first set of features being defined over a domain accessed by a plurality of network devices of the computer network;
    determining a second set of features from the DNS information, the second set of features being defined over internet protocol (IP) addresses returned for the domain;
    computing a fast-flux score based on the first and second sets of features;
    utilizing the fast-flux score to characterize fast-flux activity relating to the domain; and
    generating a fast-flux activity indicator in a network security system of the computer network in conjunction with the characterization of fast-flux activity relating to the domain;
    wherein at least a portion of the first set of features is based on a number of distinct date-based pairs with each such pair comprising one of an IP address and an autonomous system number and an associated date;
    wherein at least a portion of the second set of features is based on a number of distinct roots associated with one of an IP address and an autonomous system number; and
    wherein the steps are performed by at least one processing device comprising a processor coupled to a memory.

2. The method of claim 1 wherein the DNS information comprises DNS response logs.

3. The method of claim 1 wherein computing a fast-flux score based on the first and second sets of features comprises:
    weighting at least a subset of the first set of features;
    weighting at least a subset of the second set of features; and
    computing the fast-flux score as a specified function of the weighted first set of features and the weighted second set of features.

4. The method of claim 1 wherein computing a fast-flux score based on the first and second sets of features comprises setting the fast-flux score to a zero value if a number of distinct IP addresses in the IP addresses returned for the domain is less than or equal to a threshold minimum number of distinct IP addresses.

5. The method of claim 1 wherein computing a fast-flux score based on the first and second sets of features comprises setting the fast-flux score to a null value if a number of responses for the domain is less than or equal to a threshold minimum number of responses.

6. The method of claim 1 wherein determining a first set of features comprises determining one or more of:
    A. number of distinct IP addresses returned for the domain;
    B. median of the number of distinct IP addresses per response;
    C. number of distinct autonomous system numbers (ASNs) to which the IP addresses belong;
    D. median of the number of distinct ASNs to which the IP addresses belong per response;
    E. number of distinct (IP address, date) pairs divided by the number of distinct IP addresses;
    F. number of distinct (ASN, date) pairs divided by the number of distinct ASNs to which the IP addresses belong; and
    G. number of distinct destination IP addresses.

7. The method of claim 6 wherein determining a second set of features comprises determining one or more of:
    H. number of distinct destination IP addresses appearing with any of the IP addresses returned for the domain;
    I. median of the number of distinct destination IP addresses per returned IP address;
    J. number of distinct roots appearing with any of the IP addresses;
    K. median of the number of distinct roots per returned IP address;
    L. median of the number of distinct returned IP addresses appearing with any of the ASNs per ASN;
    M. median of the number of distinct destination IP addresses appearing with any of the ASNs per ASN; and
    N. median of the number of distinct roots appearing with any of the ASNs per ASN.

8. The method of claim 7 wherein for detection of fast-flux types that return a single IP address per response, features B and D are not utilized in computing the fast-flux score.

9. The method of claim 7 wherein computing a fast-flux score based on the first and second sets of features comprises computing the fast-flux score as:

$$FF = (A\char`\^a * B\char`\^b * C\char`\^c * D\char`\^d) / (E\char`\^e * F\char`\^f * G\char`\^g * H\char`\^h * I\char`\^i * J\char`\^j * K\char`\^k * L\char`\^l * M\char`\^m * N\char`\^n),$$

where FF denotes the fast-flux score and a, b, . . . n denote weights for respective ones of the features A, B, . . . N.

10. The method of claim 1 wherein computing a fast-flux score based on the first and second sets of features further comprises computing a normalized fast-flux score from a fast-flux score FF as follows:

$$NFF = FF/(\mu + FF),$$

where NFF denotes the normalized fast-flux score and, $\mu$ denotes a configurable normalization parameter.

11. The method of claim 1 wherein the utilizing and generating comprise:
    comparing the fast-flux score to a threshold; and
    generating an indicator of the presence or absence of fast-flux activity based on a result of the comparing.

12. The method of claim 1 wherein the domain comprises a root having a plurality of sub-domains and determining the first and second sets of features comprises determining the first and second sets of features in an aggregate manner over the plurality of sub-domains of the domain root.

13. The method of claim 1 wherein determining the first and second sets of features comprises ignoring at least one of:
    DNS responses in which all returned IP addresses are reserved IP addresses;
    IP addresses that are reserved IP addresses; and
    IP addresses that do not include ASN information.

14. An article of manufacture comprising a processor-readable storage medium having stored therein program code of one or more software programs, wherein the program code when executed by at least one processing device causes said at least one processing device:
    to determine a first set of features from domain name system (DNS) information stored in at least one database of a computer network, the first set of features being defined over a domain accessed by a plurality of network devices of the computer network;
    to determine a second set of features from the DNS information, the second set of features being defined over internet protocol (IP) addresses returned for the domain;
    to compute a fast-flux score based on the first and second sets of features;
    to utilize the fast-flux score to characterize fast-flux activity relating to the domain; and
    to generate a fast-flux activity indicator in a network security system of the computer network in conjunction with the characterization of fast-flux activity relating to the domain;
    wherein at least a portion of the first set of features is based on a number of distinct date-based pairs with each such pair comprising one of an IP address and an autonomous system number and an associated date; and
    wherein at least a portion of the second set of features is based on a number of distinct roots associated with one of an IP address and an autonomous system number.

15. An apparatus comprising:
    at least one processing device comprising a processor coupled to a memory;
    said at least one processing device being configured:
    to determine a first set of features from domain name system (DNS) information stored in at least one database of a computer network, the first set of features being defined over a domain accessed by a plurality of network devices of the computer network;
    to determine a second set of features from the DNS information, the second set of features being defined over internet protocol (IP) addresses returned for the domain;
    to compute a fast-flux score based on the first and second sets of features;
    to utilize the fast-flux score to characterize fast-flux activity relating to the domain; and
    to generate a fast-flux activity indicator in a network security system of the computer network in conjunction with the characterization of fast-flux activity relating to the domain;
    wherein at least a portion of the first set of features is based on a number of distinct date-based pairs with each such pair comprising one of an IP address and an autonomous system number and an associated date; and
    wherein at least a portion of the second set of features is based on a number of distinct roots associated with one of an IP address and an autonomous system number.

16. The apparatus of claim 15 wherein the apparatus comprises a fast-flux detector.

17. The apparatus of claim 16 wherein the fast-flux detector is configured to weight at least a subset of the first set of features, to weight at least a subset of the second set of features, and to compute the fast-flux score as a specified function of the weighted first set of features and the weighted second set of features.

18. The apparatus of claim 16 wherein the fast-flux detector is configured to compare the fast-flux score to a threshold, and to generate an indicator of the presence or absence of fast-flux activity based on a result of the comparison.

19. The article of manufacture of claim 14 wherein the domain comprises a root having a plurality of sub-domains and determining the first and second sets of features comprises determining the first and second sets of features in an aggregate manner over the plurality of sub-domains of the domain root.

20. The article of manufacture of claim 14 wherein determining the first and second sets of features comprises ignoring at least one of:
    DNS responses in which all returned IP addresses are reserved IP addresses;
    IP addresses that are reserved IP addresses; and
    IP addresses that do not include ASN information.

* * * * *